United States Patent
Rigg

[15] 3,659,541
[45] May 2, 1972

[54] NUCLEAR POWERED SHIPS

[72] Inventor: Shephard Rigg, Warrington, England
[73] Assignee: United Kingdom Atomic Energy Authority, London, England
[22] Filed: Aug. 18, 1969
[21] Appl. No.: 850,898

[30] Foreign Application Priority Data

Aug. 26, 1968 Great Britain......................40,789/68

[52] U.S. Cl............................................................114/0.5
[51] Int. Cl........................................................B63b 35/00
[58] Field of Search..................114/0.5, 16, 72, 65; 115/0.5; 176/37, 38

[56] References Cited

UNITED STATES PATENTS

| 3,047,485 | 7/1962 | Ellis | 176/38 |
| 3,314,858 | 4/1967 | Villadsen | 176/38 |

Primary Examiner—Trygve M. Blix
Attorney—Larson, Taylor & Hinds

[57] ABSTRACT

A nuclear powered ship has its collision barriers made water tight and means are provided for filling the barriers with water to act as a shield against radiation in the event of, or as a precaution against, a "maximum credible accident," thus avoiding the need for a permanent shield outside the reactor containment vessel. Coffer dams in the ship can be similarly treated to give protection to the ship's crew. The means for filling the barriers may be a ring main pipe with access fore and aft of the ship or the ship's ballast system may be adapted to provide the filling water for the barriers.

5 Claims, 2 Drawing Figures

3,659,541

NUCLEAR POWERED SHIPS

BACKGROUND OF THE INVENTION

The present invention concerns nuclear powered ships and it is concerned with the shielding of reactors in ships especially under emergency conditions.

The safety provisions incorporated in the design of reactors in ships is based on the concept of the "maximum credible accident." This concept produces the situation of a nuclear reactor where coolant has failed to perform its duty, the fuel has melted and fission products have escaped from the reactor vessel or any associated reactor coolant ducting but have not escaped beyond a sealed containment vessel outside the reactor vessel. In this situation it is to be assumed that the fission products have settled onto the inner wall of the containment vessel and create what is known as "shine," this being of such intensity that shielding is specifically required to attenuate it for safety of both crew of the ship and those who may have to come near the ship in port or in salvage operations. Previously this attenuation has been provided by shielding installed round the containment vessel and carried at all times. (See, for example, "Engineer" dated Jan. 1, 1965 at p. 55 which shows a cross-sectional view of the "Otto Hahn" nuclear ship—FIG. 3).

SUMMARY OF THE INVENTION

The present invention provides emergency shielding facilities without actually installing a physical shield in the ship, the shielding facilities being an adaptation of other facilities already existing in a nucleared powered ship. These adapted facilities are the ship's collision barriers which are chambers provided along the sides of the ship which can accept impact of collision and protect the reactor compartment.

Hence, the nuclear powered ship of the present invention is characterized in that its collision barriers are of water tight construction and have associated means for filling the collision barriers with water to provide shielding.

The means for filling the collision barriers can take a number of forms. For example, where filling is required when the ship is in harbor a "dry" ring main may be provided with inlet valves and connectors at various points around the ring remote from the reactor compartment so they can be approached when intense radiation exists in the vicinity of the nuclear reactor. Where filling is required when the ship is at sea a pump is provided driven from emergency services. Preferably at least two pumps are provided, one at each end of the ship.

DESCRIPTION OF THE DRAWINGS

The invention will now be further described with reference to the accompanying drawing in which.

DESCRIPTION OF PREFERRED EMBODIMENTS

Figure 1:
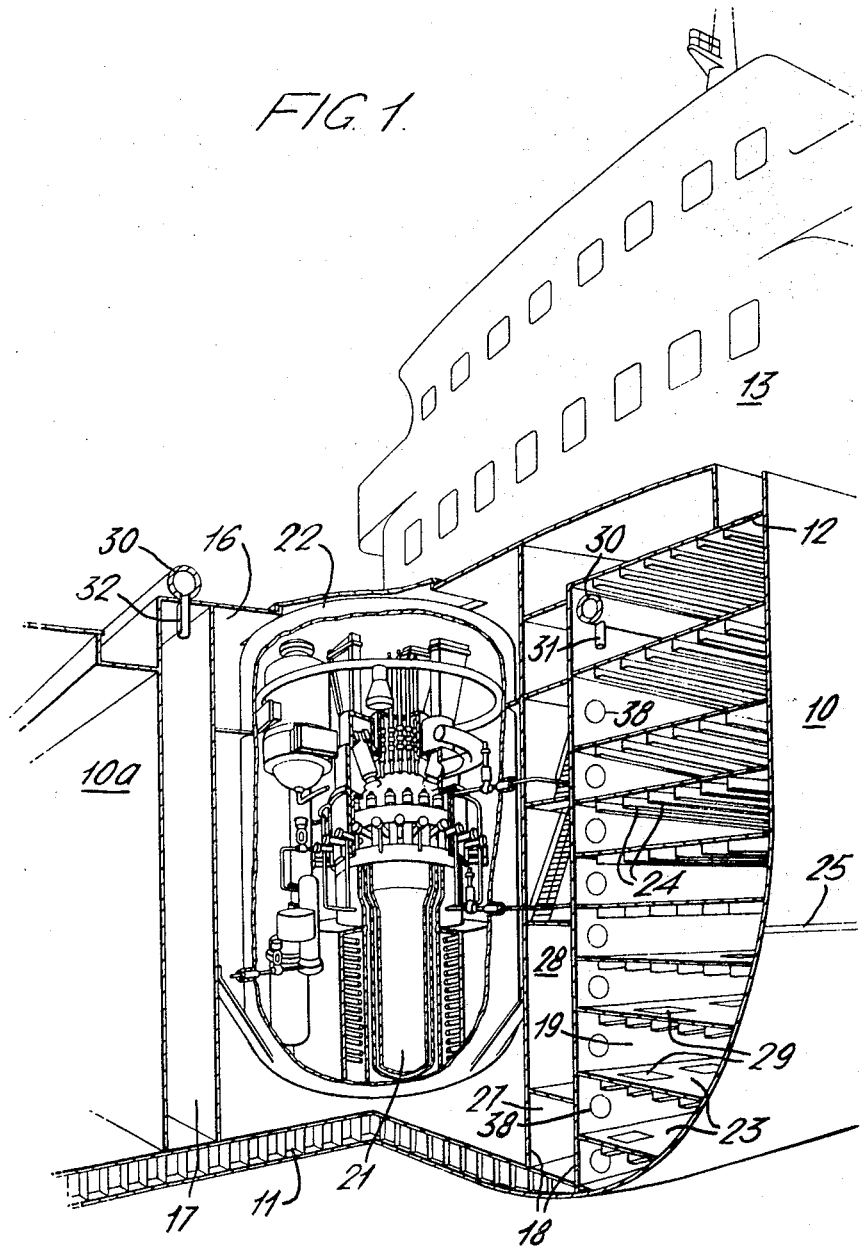
FIG. 1 is a cut-away perspective view of a part of a nuclear ship.
Figure 2:
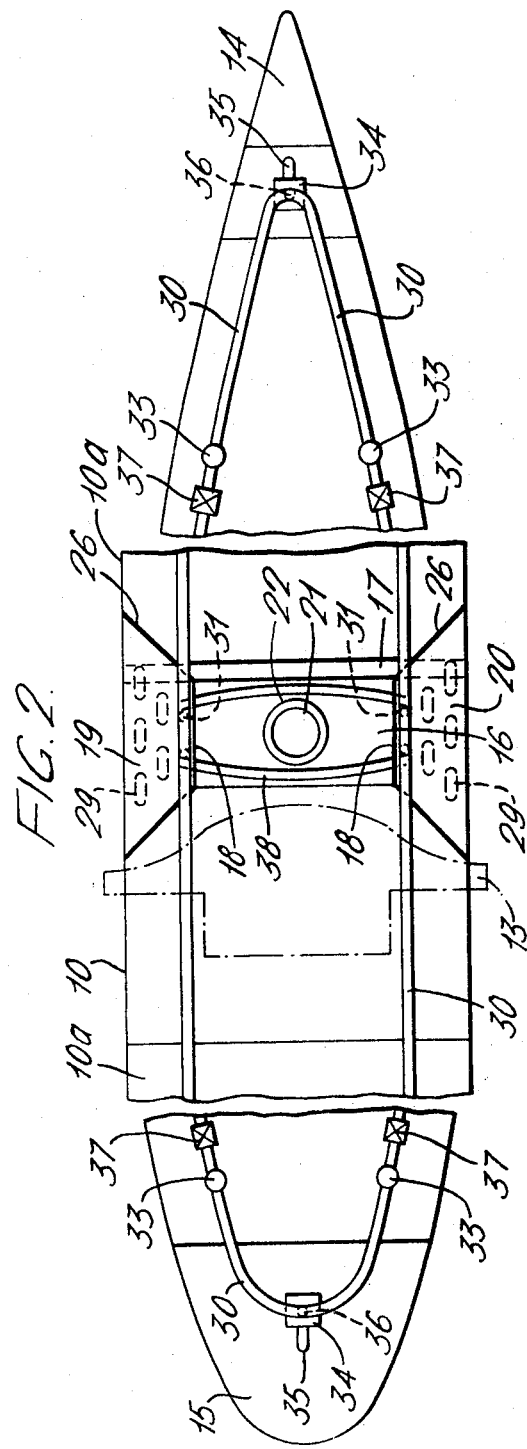
FIG. 2 is a diagrammatic plan view of the ship.

The ship is generally indicated in FIG. 1 by its hull 10, with cargo space 10a, double bottom 11, main deck 12 and bridge 13. In FIG. 2 the forward end of the ship is given the reference numeral 14 and the aft end the numeral 15. In more detail the ship has a reactor compartment 16 with a forward coffer dam 17, bulkheads 18 and port and starboard collision barriers 19, 20. The reactor compartment houses a pressurized water reactor 21 in a containment vessel 22. (The reactor has not been shown with all its associated detail.) The collision barrier is made from a number of horizontal plates 23, with supports 24, which span between the hull 10 and the bulkheads 18. The barrier extends both above and below the water line 25 on both the port and starboard sides of the ship in the region occupied by the reactor 21. In FIG. 2 the extent in plan view of the barrier is indicated by the thickened line 26. Ship ballast services are provided in the lowest compartment 27 between the bulkheads 18. Other compartments 28 carry miscellaneous services. The barriers 19, 20 are generally kept empty and certainly free of anything which could act as a missile in the event of a collision or otherwise apply impact forces to the reactor containment. The preceding description could be regarded as typical of a nuclear powered ship with the exception that in previously designed ships a massive radiation shield (usually of lead) is provided in the reactor compartment between the containment vessel 22 and the bulkheads and coffer dams to provide a shielding in the event of an accident to the reactor 21 which causes radioactive material to settle on the inside of the vessel 22.

The present invention dispenses with the massive radiation shield and introduces, in the embodiment showing the following additional features:

a. the collision barriers 19, 20 are constructed water tight so that they can function as water tanks both above and below the water line;
b. the plates 23 in the barriers have perforations 29 to allow the barriers to fill easily with water;
c. water mains 30 provided with outlets 31 to the collision barriers 19, 20.

The mains 30 can be extended to have outlets 32 to the coffer dam 17.

The mains 30 are shown diagrammatically in FIG. 2. They are of ring form to extend over both collision barriers and the forward and aft ends of the ship. They are provided with connecting points 33 so that the barriers can be either flooded as a safety measure in port or connected to a water supply when in port for immediate flooding of the barriers should the need arise. These connecting points are at a distance from the reactor so that they are accessible in an emergency by virtue of the shielding offered by the ships structure. At sea, access may be required to the connecting points 33 so that a salvage ship can flood the barriers.

The mains 30 also include fore and aft pumps 34 with inlets 35 and outlets 36 which include non-return valves. The pumps are driven by emergency diesel-electric sets so that the ship can flood its own barriers 19, 20 while still at sea.

The flooding of the coffer dam 17 can give added radiation protection to the crew of the ship.

The ballast system, as represented by compartment 27, could replace or augument the mains 30 by the provision of suitable dry risers.

The ballast system could itself be sealed and water driven up the dry risers by pressurizing the ballast system. Alternatively pumps could be associated with the dry risers with the pumps taking their water from the ballast system.

The mains 30 are, as far as possible, located in a position where they will not be damaged by collision. Valves 37 are provided at intervals to isolate damaged portions and cross mains 38 are provided so that either collision barrier can be filled from both starboard and port parts of the mains 30.

While it would be possible to arrange that the apparatus described above is operated automatically it is preferred that the operation should be manually initiated based on alarm signals. Suitable alarms could be based on loss of coolant pressure, loss of coolant flow, fission products levels in the coolant and activity measured outside the containment vessel 22.

As a safety precaution when in harbor the barriers 19, 20 could be flooded anyway or, at least connected to a water supply operable from the harbor.

I claim:

1. A nuclear powered ship comprising: a nuclear reactor, inner and outer hulls along the port and starboard sides of the nuclear reactor, the intervening spaces between the hulls including stiffening means and forming collision barriers, coffer dams extending across the ship fore and aft of the nuclear reactor, said collision barriers and said coffer dams being water tight compartments, and means for filling the barriers and the coffer dams with water, whereby said barriers and coffer dams can be filled with water to provide a shielding material, thereby permitting the omission of a thick solid shielding material around the nuclear reactor.

2. A ship as claimed in claim 1 wherein said means comprises pipework open to discharge into the barriers and connecting means with the pipework for the supply of water.

3. A ship as claimed in claim 1 wherein said means comprises the ballast system of the ship having pipes to the barriers and means for driving water along said pipes.

4. A ship as claimed in claim 2 wherein pumps are connected with said pipework, one pump being located at the fore end of the ship and one pump being located at the aft end of the ship and the inlet of the pump reaching below the water line of the ship.

5. A ship as claimed in claim 2 wherein said pipework extends along port and starboard sides of the ship and branches to said pipework extend across the ship so that the port part connect with port and starboard collision barriers and the starboard part connects with starboard and port collision barriers.

* * * * *